US008060344B2

(12) United States Patent
Stathis

(10) Patent No.: US 8,060,344 B2
(45) Date of Patent: Nov. 15, 2011

(54) METHOD AND SYSTEM FOR AUTOMATICALLY PERFORMING A STUDY OF A MULTIDIMENSIONAL SPACE

(76) Inventor: Sam Stathis, New York, NY (US)

( * ) Notice: Subject to any disclaimer, the term of this patent is extended or adjusted under 35 U.S.C. 154(b) by 0 days.

(21) Appl. No.: 11/766,672

(22) Filed: Jun. 21, 2007

(65) Prior Publication Data

US 2008/0046221 A1 Feb. 21, 2008

Related U.S. Application Data

(60) Provisional application No. 60/805,983, filed on Jun. 28, 2006.

(51) Int. Cl.
| | |
|---|---|
| G06F 17/50 | (2006.01) |
| G06F 7/60 | (2006.01) |
| G06F 3/048 | (2006.01) |
| G06G 7/48 | (2006.01) |
| G05D 1/02 | (2006.01) |
| G01C 9/00 | (2006.01) |
| G01C 3/00 | (2006.01) |
| G01C 3/08 | (2006.01) |
| G01B 11/26 | (2006.01) |

(52) U.S. Cl. ............... 703/1; 703/2; 703/6; 701/300; 702/150; 702/153; 715/848; 348/135; 348/154; 348/248; 348/373; 356/139.1; 356/139.08; 356/141.1; 356/141.3; 356/144; 356/247; 356/249; 356/4.01; 356/4.08; 356/400; 356/622

(58) Field of Classification Search .............. 703/1, 2, 703/6, 300; 348/135, 154, 348, 373; 702/150, 702/153; 705/848; 356/139.08, 139.1, 141.1, 356/141.3, 144, 247, 249, 3.12, 4.01, 4.08, 356/400, 622

See application file for complete search history.

(56) References Cited

U.S. PATENT DOCUMENTS

| | | | | |
|---|---|---|---|---|
| 4,908,573 A | * | 3/1990 | Kaufman et al. | 324/309 |
| 4,912,643 A | * | 3/1990 | Beirne | 702/150 |
| 5,100,229 A | * | 3/1992 | Lundberg et al. | 356/3.12 |
| 5,110,202 A | * | 5/1992 | Dornbusch et al. | 356/3.12 |
| 5,175,616 A | * | 12/1992 | Milgram et al. | 348/47 |
| 5,301,005 A | * | 4/1994 | deVos et al. | 356/141.1 |
| 5,309,212 A | * | 5/1994 | Clark | 356/5.09 |
| 5,440,112 A | * | 8/1995 | Sakimura et al. | 250/203.1 |
| 5,477,459 A | * | 12/1995 | Clegg et al. | 701/300 |
| 5,539,513 A | * | 7/1996 | Dunne | 356/5.01 |
| 5,589,939 A | * | 12/1996 | Kitajima | 356/622 |
| 5,673,377 A | * | 9/1997 | Berkaloff | 345/585 |
| 5,751,408 A | * | 5/1998 | Ohtomo et al. | 356/5.14 |
| 5,767,952 A | * | 6/1998 | Ohtomo et al. | 356/4.01 |
| 5,867,263 A | * | 2/1999 | Ohtomo et al. | 356/247 |
| 5,898,490 A | * | 4/1999 | Ohtomo et al. | 356/141.3 |

(Continued)

OTHER PUBLICATIONS

Medjdoub et al. "Generation of Variational Standard Plant Room Solutions" Automation in Construction 12: 2002.*

(Continued)

*Primary Examiner* — Kamini S Shah
*Assistant Examiner* — Shambhavi Patel
(74) *Attorney, Agent, or Firm* — Stanley H. Kremen

(57) ABSTRACT

A method and system comprising a Master station, a processor and one or more targets that allows a user of said system to automatically generate a 3 dimensional graphical representation of a construction site and also overlay a drawing onto the graphical representation to guide the user within a virtual space being displayed by the processor.

18 Claims, 8 Drawing Sheets

U.S. PATENT DOCUMENTS

| | | | |
|---|---|---|---|
| 5,923,468 A * | 7/1999 | Tsuda et al. | 359/426 |
| 5,946,087 A * | 8/1999 | Kasori et al. | 356/249 |
| 5,995,233 A * | 11/1999 | Ohtomo et al. | 356/400 |
| 6,046,800 A * | 4/2000 | Ohtomo et al. | 356/141.1 |
| 6,075,586 A * | 6/2000 | Ohtomo et al. | 356/4.08 |
| 6,083,353 A * | 7/2000 | Alexander, Jr. | 202/158 |
| 6,249,338 B1 * | 6/2001 | Ohtomo et al. | 356/4.08 |
| 6,369,755 B1 * | 4/2002 | Nichols et al. | 342/357.52 |
| 6,381,006 B1 * | 4/2002 | Ramstrom | 356/4.01 |
| 6,434,508 B1 * | 8/2002 | Lin et al. | 702/153 |
| 6,590,640 B1 * | 7/2003 | Aiken et al. | 356/3.01 |
| 7,072,032 B2 * | 7/2006 | Kumagai et al. | 356/139.08 |
| 7,081,917 B2 * | 7/2006 | Shimoyama et al. | 348/135 |
| 7,085,672 B2 * | 8/2006 | Ishii et al. | 702/150 |
| 7,184,088 B1 * | 2/2007 | Ball | 348/348 |
| 7,398,481 B2 * | 7/2008 | Kraus et al. | 715/848 |
| 7,477,359 B2 * | 1/2009 | England et al. | 356/4.01 |
| 7,564,538 B2 * | 7/2009 | Sakimura et al. | 356/4.01 |
| 2002/0060788 A1 * | 5/2002 | Ohtomo et al. | 356/139.1 |
| 2004/0233415 A1 * | 11/2004 | Nakamura et al. | 356/4.01 |
| 2005/0102063 A1 * | 5/2005 | Bierre | 700/247 |
| 2006/0192946 A1 * | 8/2006 | Walser | 356/144 |

OTHER PUBLICATIONS

Cai, Hubo. "Accuracy Evaluation of a 3-D Spatial Modeling Approach to Model Linear Objects and Predict their Lengths", 2003.*

Bosche et al. "Integrating Data From 3D CAD and 3D Cameras for Real-Time Modelling", Joint International Conference on Computing and Decision Making in Civil and Building Engineering, Jun. 2006.*

Stone et al. "LADAR Sensing Applications for Construction", Jun. 2001.*

Akinci et al. "A formalism for utilization of sensor systems and integrated project models for active construction quality control", Automation in Construction 15 (2006) 124-138.*

Bridges et al. "On Architectural Design in Virtual Environments", Elsevier 1997.*

Cheok et al. "Ladars for Construction Assessment and Update", Automation in Construction 9_2000.463-477.*

* cited by examiner

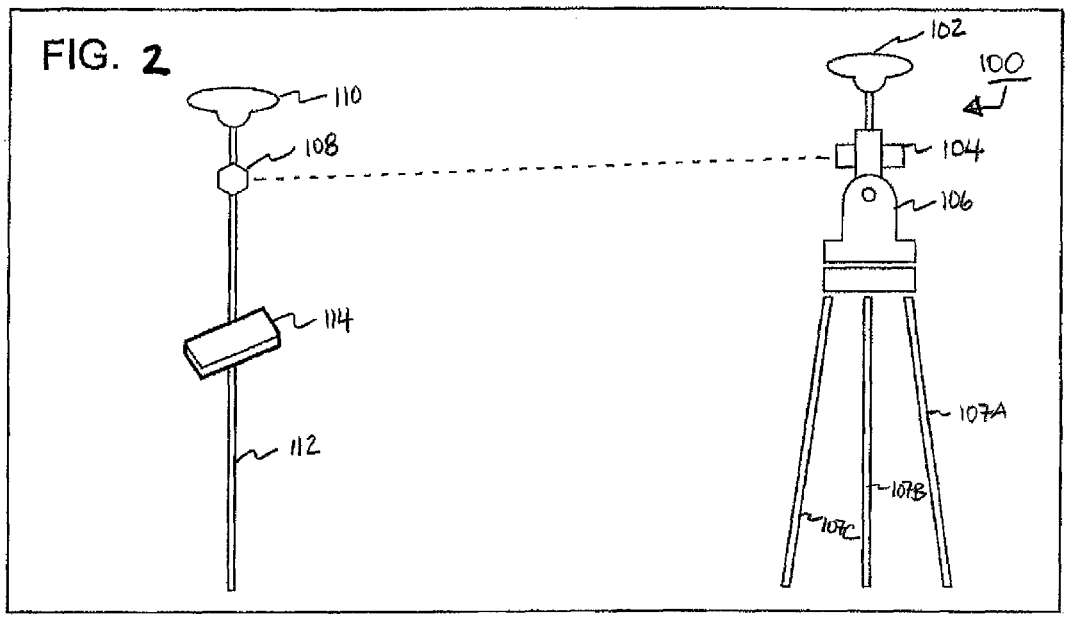
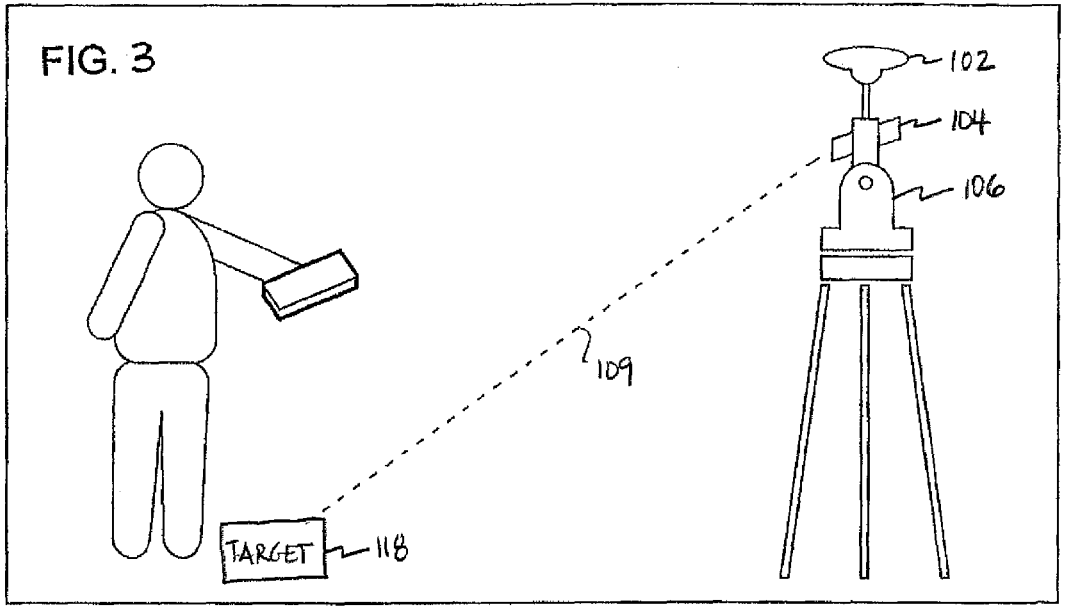

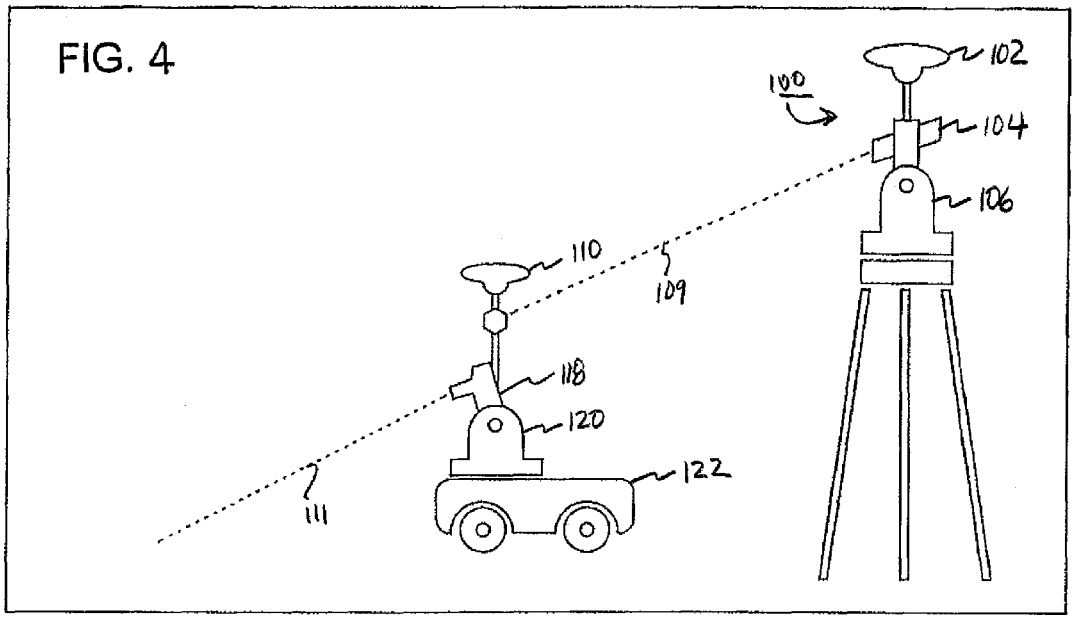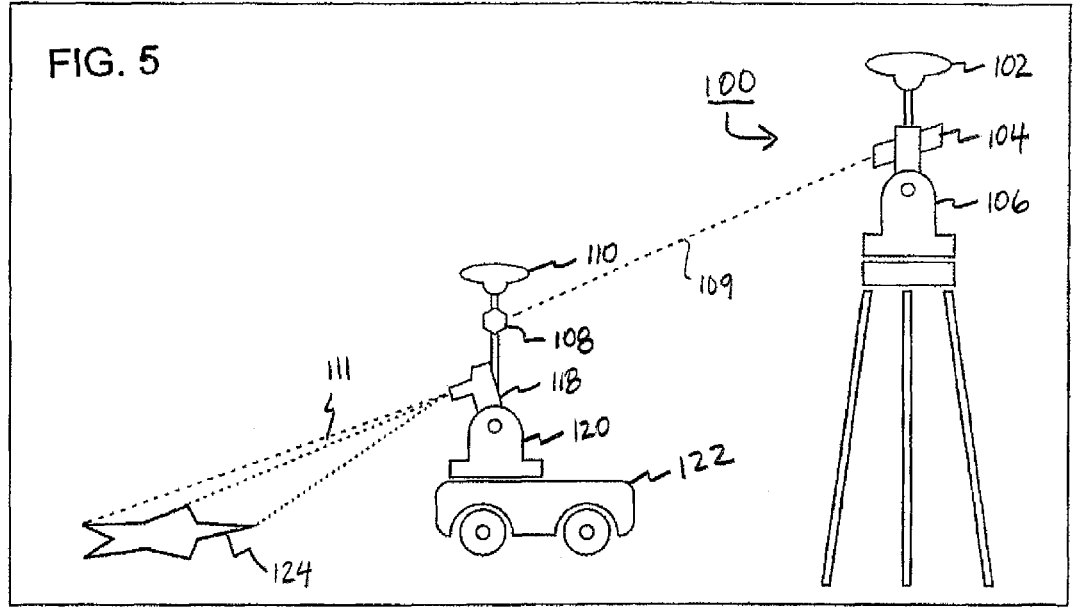

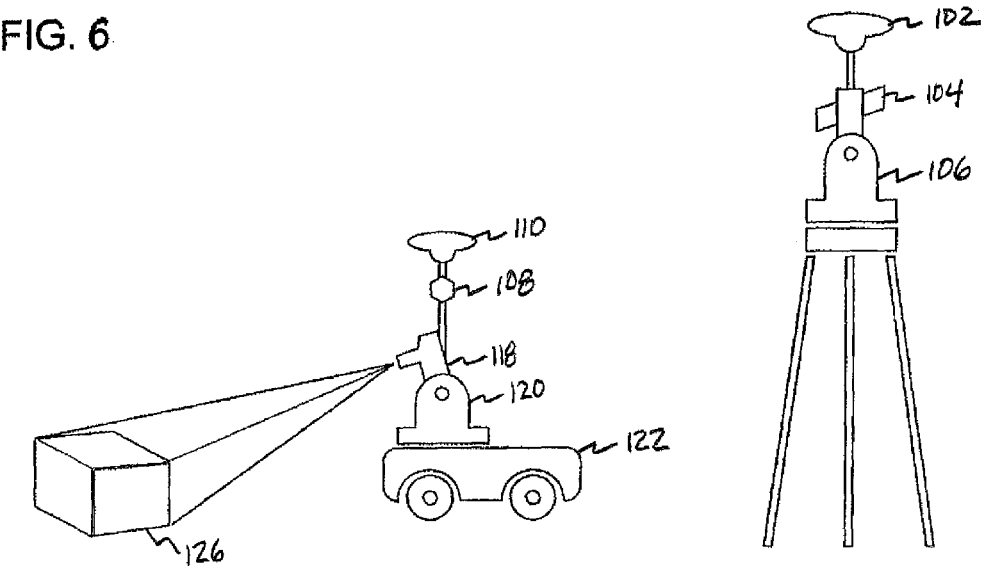
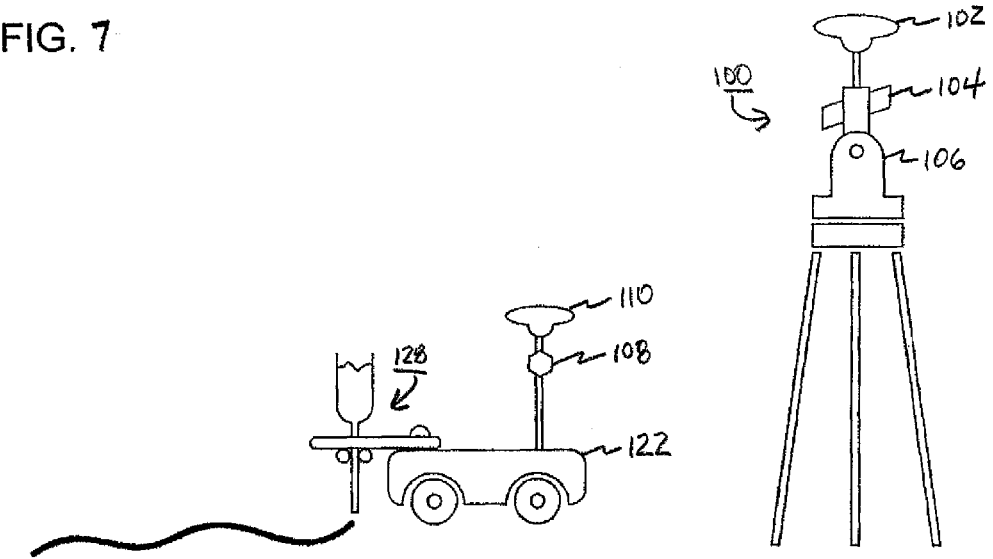

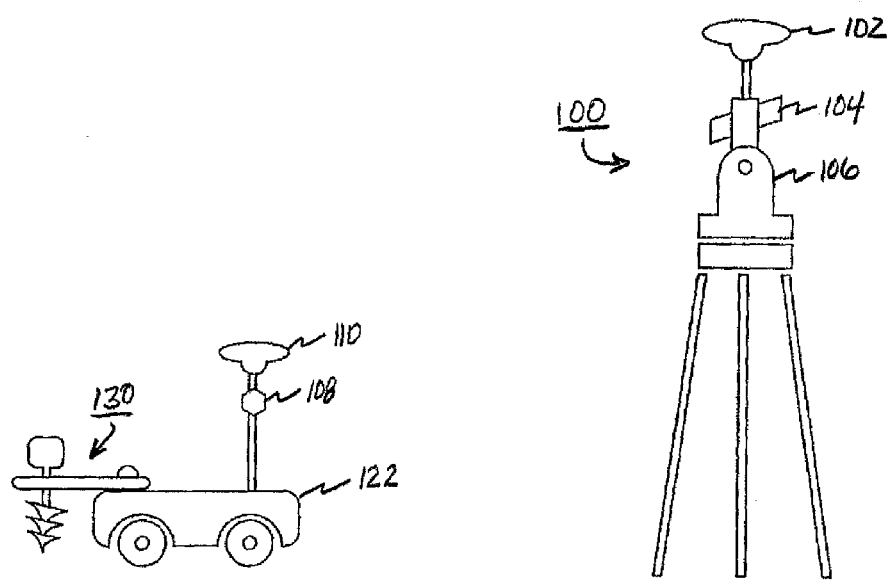
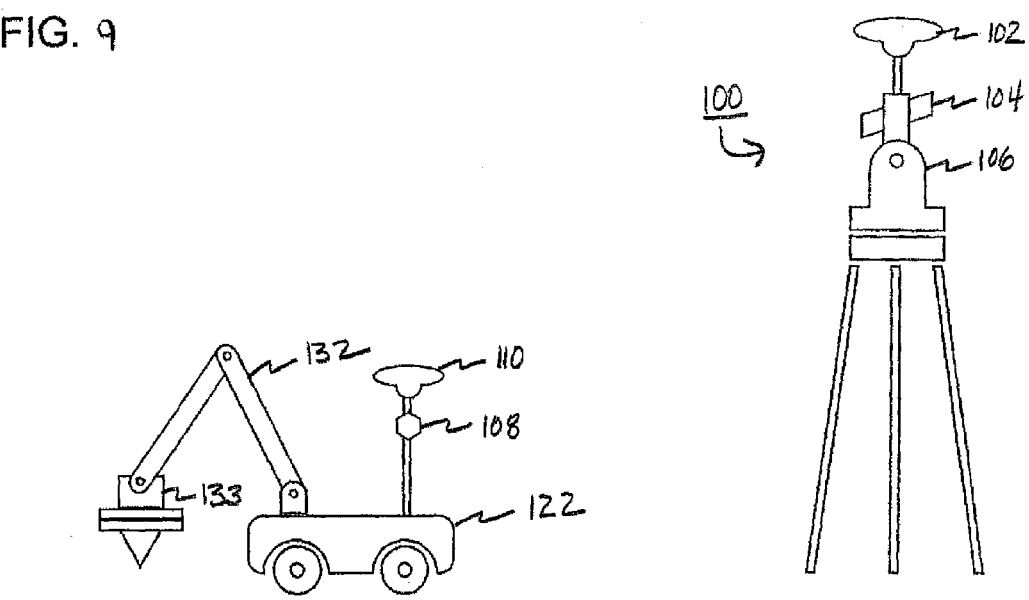

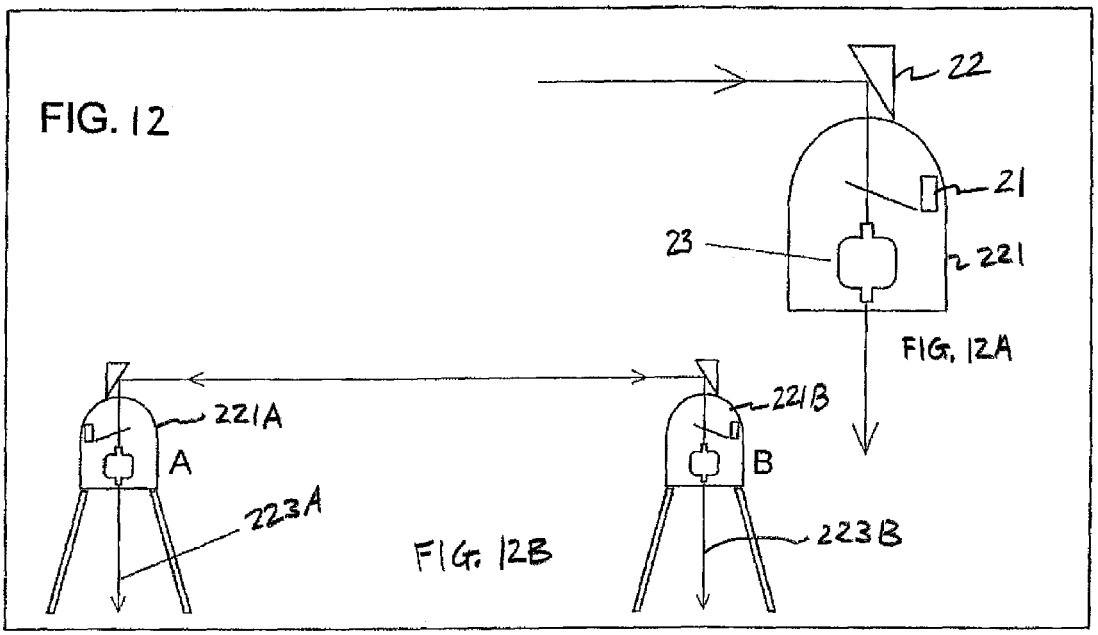
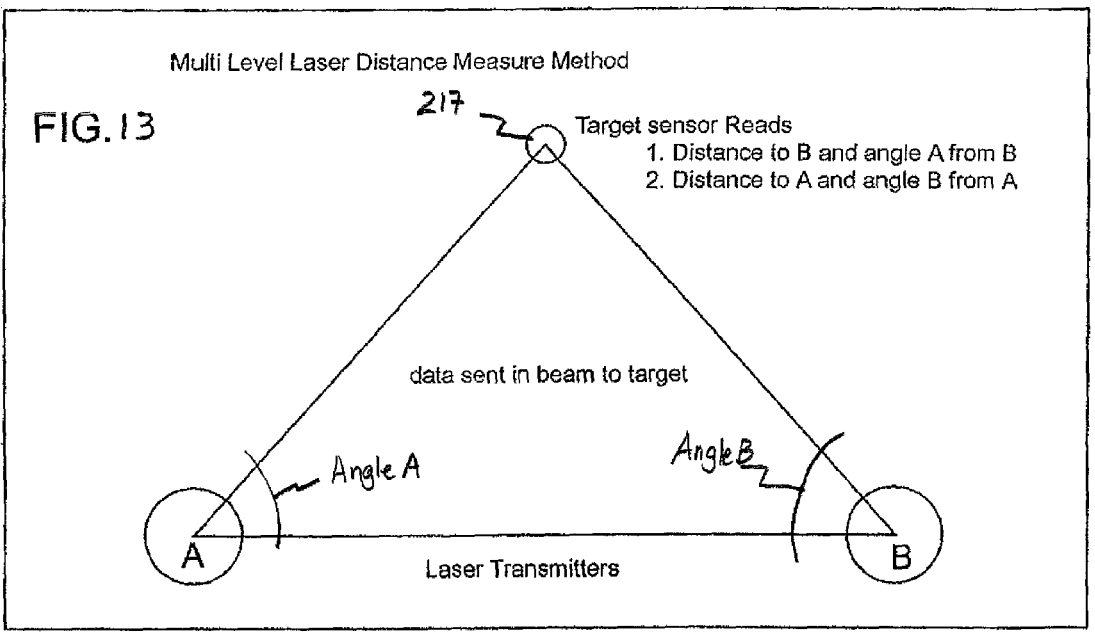

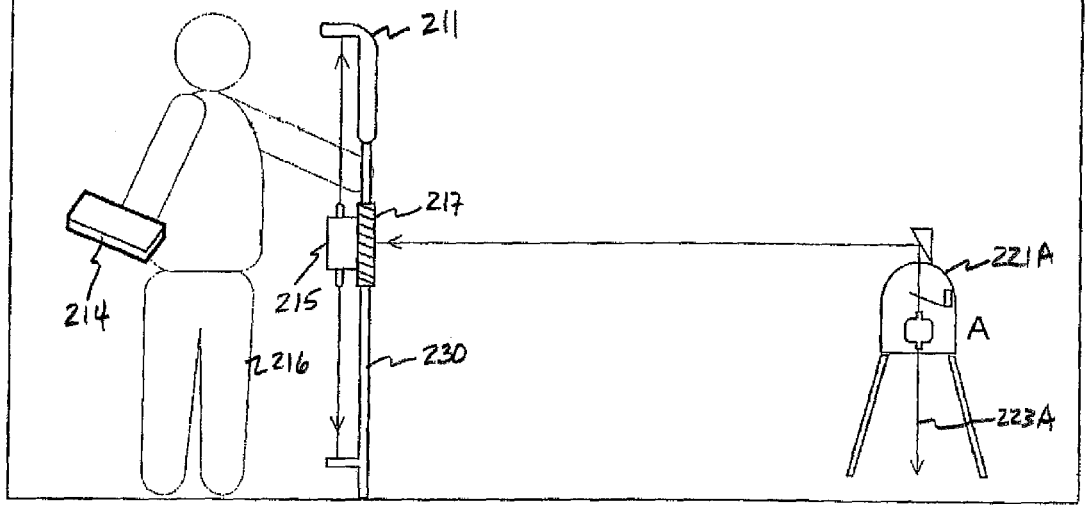
FIG. 14
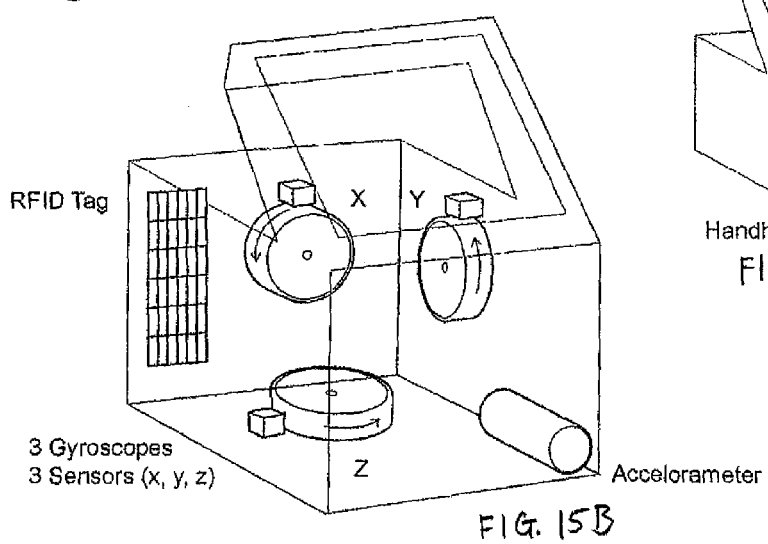
FIG. 15 Gyroscopic Distance & Attitude Measurement Device
Handheld CAD Computer
FIG. 15A
RFID Tag
3 Gyroscopes
3 Sensors (x, y, z)
Accelerometer
FIG. 15B

METHOD AND SYSTEM FOR AUTOMATICALLY PERFORMING A STUDY OF A MULTIDIMENSIONAL SPACE

This application claims the benefit of the filing date of a provisional application having Application No. 60/805,983 titled "Method for Accurately and Precisely Locating and Marking a Position in Space Using Wireless Communications" filed on Jun. 28, 2006.

FIELD OF THE INVENTION

The present invention relates to a system and method for generating, in automatic fashion, a graphical representation of a multidimensional space.

BACKGROUND OF THE INVENTION

Realization of a design from concept to implementation is a challenge, particularly as it relates to the construction industry. In the construction industry, architects, planners, engineers and the like are charged with the task of conceptualizing ideas and reducing the concepts to tangible form such as design drawings, that can then be implemented by contractors in the field. The implementation or construction process can be an arduous task, the success of which relies heavily on the ability of a contractor to accurately replicate the dimensions and spatial relationships shown in the drawings or design documents pertaining to the particular project at hand. Errors by contractors in replicating what the design documents indicate are a common feature of construction practice and one that oftentimes results in costly corrective action. In some instances, the error is due to the lack of a real appreciation of the characteristics of a site at which construction is to take place. For example, if the design for a space to be renovated calls for a door to be placed in a specific location and that location at the construction site turns out to have a column in the exact location where the door is called for, a costly redesign of the design drawings may become necessary. Another common occurrence that leads to costly remedial measures is where inaccurate layout of a construction site leads to construction of major elements of the design in the wrong place leading to costly retrofitting when the error is ultimately discovered.

Generally, the success of any construction project relies heavily on good dimensional controls that can be relied upon so that the spatial relationships contemplated in a design can be accurately reproduced in the field. Dimensional controls are usually the province of architects, tradesman (e.g., electricians, plumbers, Drywall installers) or surveyors. Typical 'as built studies' or surveying tasks include measuring or surveying a site to determine existing conditions and the layout of benchmarks, reference points and other monuments that can be used to properly orient the contractors as they build out the design. When errors occur in the performance of these tasks, the type of errors described above result. Sometimes errors are not due to inaccurate measurements or 'as built studies', but rather to poor control of monuments such as when a monument or benchmark such as a stake is inadvertently knocked over or a pencil mark is inadvertently smeared in the field by a person or a piece of equipment. It is not entirely uncommon for a workman in a situation such as this to simply replace the pencil mark or stake in a location thought to have been its original location but which, is actually not the original location. When this occurs, any subsequent reference to this benchmark will result in errors resulting from the fact that a dimensional control is now in the wrong place but not known to be in the wrong place. Moreover, errors resulting from the use of the now inaccurate reference point can be further compounded by the fact that the errors may not be discovered for some time.

Errors in measurement or surveying, whether they are related to the study of a site or the layout of a design, can only be avoided by starting with a precise 'as built verification' and vigilant protection of benchmarks and monuments and their frequent re-verification. In practice, this task can be extremely time consuming and labor intensive typically requiring crews of personnel to revisit a site frequently and manually verify existing benchmarks and monuments or as needed, manually establish new benchmarks and monuments.

SUMMARY OF THE INVENTION

The present invention provides a system and method for the automatic generation of an N-dimensional graphical representation of a multidimensional space where N is an integer equal to 2 or greater.

The method of performing an automatic study of a multidimensional space (e.g., a 3D space) using the system of the present invention involves the measurement of distances from system equipment to one or more selected points of reference within the multi-dimensional space and the measurement of distances from system equipment to various existing objects and structures within the multi-dimensional space. These measurements are used by the system of the invention to generate automatically, in real time, a drawing (which may be in digital format) or graphical representation of the multidimensional space based on the measurements made by the system equipment at least part of which is located within the multidimensional space.

Moreover, in addition to creating a graphical representation, in real time, of the multi-dimensional space being studied, the system of the present invention can also show the position, in real time, of one of its components (e.g., a target) relative to the measured locations of the multi-dimensional space being studied. When such component is affixed to a user or is possessed by a user of the system, the method and system is thus able to display the location of the user within the space being studied or within a virtual space overlaid on the space being studied to guide the user through the spaces.

The automatic layout of the multidimensional space a construction site in accordance with the method and system of the present invention involves using points of references such as benchmarks and targets to establish the location, position and orientation of one or more structures and/or objects designated to be disposed within the multidimensional space. Typically a design for the development of a multi-dimensional space is memorialized as one or more drawings (e.g., CAD or Computer Aided Design drawings) that precisely depict the spatial relationships between objects and/or structures of the multi-dimensional space to be constructed. The design, when depicted graphically, represents a virtual space having specific physical features. During the execution of the automatic layout of the multi-dimensional space by a user of the system of the present invention, the system, with reference to the design drawings, orients itself within the multi-dimensional space and then points out the precise location of selected objects and/or structures contained in the design drawings as they would translate to the multi-dimensional space. Thus, the present invention is able to guide the user within the multi-dimensional space to a single point (or area or volume or other higher dimensional region) enabling the user to make markings within the multi-dimensional space indicating the specific positioning, orientation and/or arrangement of objects and/or structures to be constructed at or within the boundaries of the multi-dimensional space. In one embodiment of the present invention, the user is able to control equipment of the system of the present invention to automatically make the markings for structures and/or objects specified in the design.

The system of the present invention comprises components including at least one Master station, a Processor, and one or more targets. The components of the system of the present invention are in communication with each other to allow the system to perform an automatic study and layout of a multi-dimensional space. During the study and/or layout of the multidimensional space, the system can guide a user within the multi-dimensional space by displaying the multi-dimensional space (e.g., a 3D graphics representation), including known or already studied objects and/or structures and the user's current physical location simultaneously effectively guiding the user within the multi-dimensional space and effectively indicating to the user where to make markings when the user is performing a layout of the multidimensional space. Further, the system of the present invention can display the virtual space as an overlay to the multi-dimensional space depiction. Thus, as the user physically moves within the multi-dimensional space, the system of the present invention is able to track the user's location and display said location within the graphical representation of the actual and/or virtual space in real time. The display can be part of the Master Station or part of the Processor or both components can have displays.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed concepts and specific embodiment as a basis for designing or modifying other devices for carrying out the same purposes of the present invention and that such other devices do not depart from the spirit and scope of the invention in its broadest form.

BRIEF DESCRIPTION OF THE DRAWINGS

Reference will now be made in detail to the preferred embodiments of the present invention, examples of which are illustrated in the accompanying drawings.

FIG. 2 shows a first embodiment of the system of the present invention comprising a Master station, a target and a portable processor;

FIG. 3 shows a second embodiment having a laser beam emanating from the Master station to mark a location based on commands from the portable processor;

FIG. 4 shows a third embodiment of the system of the present invention where the Master station directs a mobile robot to produce a visible marking on a surface within the multidimensional space.

FIG. 5 shows a fourth embodiment (similar to that of FIG. 4) where the marking is a projection vector overlay of a desired pattern;

FIG. 6 shows the fourth embodiment where the marking is a two dimensional projection simulating a three dimensional pattern;

FIG. 7 shows a fifth embodiment where the Master station directs the mobile robot to use paint to mark positions on the ground;

FIG. 8 shows a sixth embodiment wherein the Master station directs the mobile robot to a location to perform a tooling operation such as drilling;

FIG. 9 shows a seventh embodiment where the Master station directs the mobile robot to a location to perform metrology with a robot arm capable of measuring and marking on the floor;

FIG. 12A shows an elevational view of two laser rangefinding units (A and B) each capable of measuring both its vertical height from the floor and its distance from the other rangefinder;

FIG. 12B shows an enlarged view of a laser rangefinder and rotating prism;

FIG. 13 shows a plan view of the configuration of FIG. 12 which additionally shows a target sensor for position triangulation;

FIG. 14 shows a rangefinder that uses a pole with a sensor and other equipment to provide distance and height measurements;

FIGS. 15A and 15B show a portable processor having an inertial measurement system comprising three gyroscopes and an accelerometer; FIG. 15A is an isometric view of the exterior of the portable processor; FIG. 15B is an isometric view showing the essential components disposed within the Processor unit.

DETAILED DESCRIPTION

Figure 1:
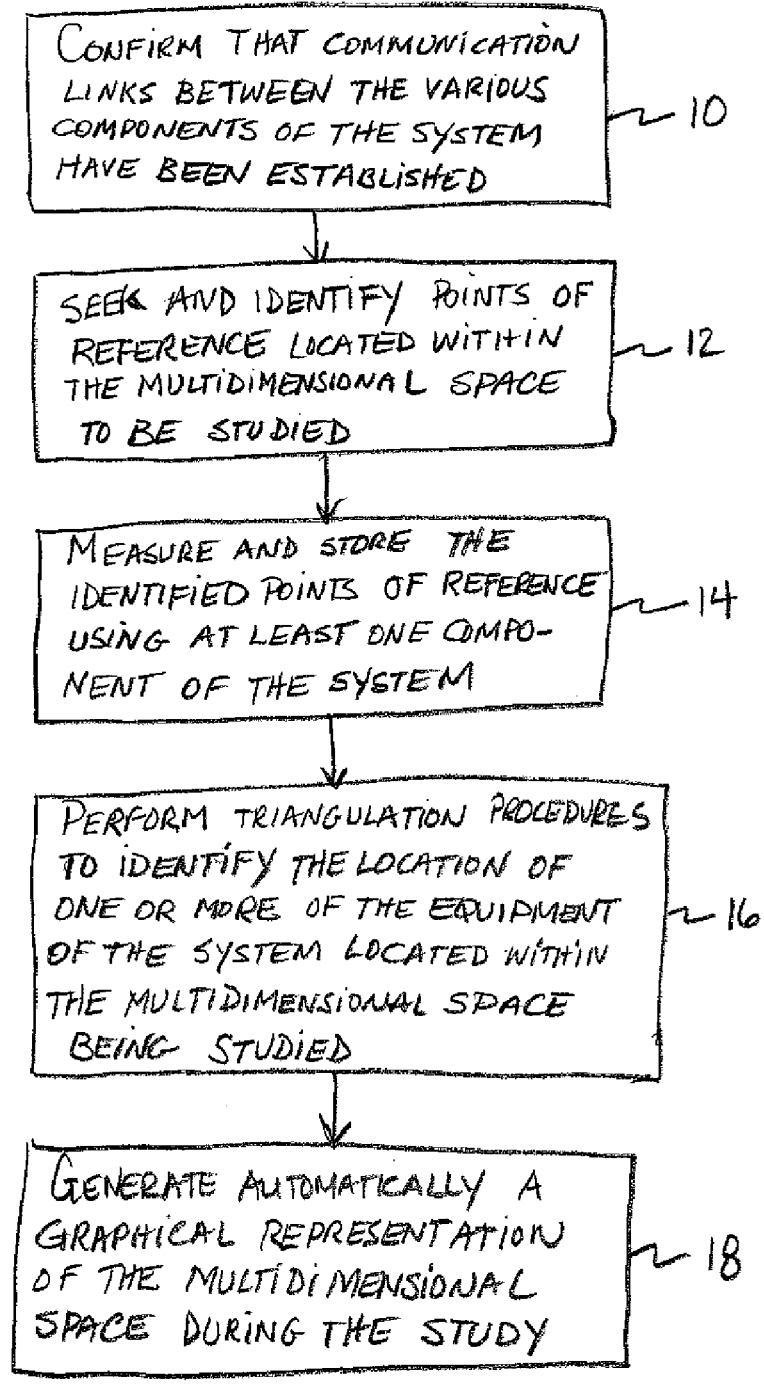
FIG. 1 shows a flow chart of the method of the present invention.

The present invention provides a system and method for the automatic generation of an N-dimensional graphical representation of a multidimensional space where N is an integer equal to 2 or greater. For ease of explanation and clarity of description, the system and method of the present invention will be described in the context of a construction project in which structures and/or objects are constructed, arranged, positioned and oriented with respect to each other in a multidimensional space to whose specific physical characteristics are represented in a drawing such as a CAD (Computer Aided Design) drawing generated by an architect and/or engineer or other construction professional. It will be understood that the method and system of the present invention are not limited to automatic study and/or layout of a construction project, but encompasses the rearrangement of any multidimensional space using objects and/or structures already existing in the space or introduced into the space.

The method of performing an automatic study of a multi-dimensional space (e.g., a 3D space) using the system of the present invention involves the measurement of distances from system equipment to one or more selected points of reference within the multi-dimensional space and the measurement of distances from system equipment to various existing objects and structures within the multi-dimensional space. These measurements are used by the system of the invention to generate automatically, in real time, a drawing (which may be in digital format) or graphical representation of the multidimensional space based on the measurements made by the system equipment at least part of which is located within the multidimensional space.

Moreover, in addition to creating a graphical representation, in real time, of the multi-dimensional space being studied, the system of the present invention can also show the position, in real time, of one of its components (e.g., a target) relative to the measured locations of the multi-dimensional space being studied. When such component is affixed to a user or is possessed by a user of the system, the method and system is thus able to display the location of the user within the space being studied or within a virtual space overlaid on the space being studied to guide the user through the spaces.

The automatic layout of the multidimensional space a construction site in accordance with the method and system of the present invention involves using points of references such as benchmarks and targets to establish the location, position and orientation of one or more structures and/or objects designated to be disposed within the multidimensional space. Typically a design for the development of a multi-dimensional space is memorialized as one or more drawings (e.g., CAD or Computer Aided Design drawings) that precisely depict the spatial relationships between objects and/or structures of the multi-dimensional space to be constructed. The design, when depicted graphically, represents a virtual space having specific physical features. During the execution of the automatic layout of the multi-dimensional space by a user of the system of the present invention, the system, with reference to the design drawings, orients itself within the multi-dimensional space and then points out the precise location of selected objects and/or structures contained in the design drawings as they would translate to the multi-dimensional space. Thus, the present invention is able to guide the user within the multi-dimensional space to a single point (or area or volume or other higher dimensional region) enabling the user to make markings within the multi-dimensional space indicating the specific positioning, orientation and/or arrangement of objects and/or structures to be constructed at or within the boundaries of the multi-dimensional space. In one embodiment of the present invention, the user is able to control equipment of the system of the present invention to automatically make the markings for structures and/or objects specified in the design.

The system of the present invention comprises components including at least one Master station, a Processor, and one or more targets. The components of the system of the present invention are in communication with each other to allow the system to perform an automatic study and layout of a multi-dimensional space. During the study and/or layout of the multidimensional space, the system can guide a user within the multi-dimensional space by displaying the multi-dimensional space (e.g., a 3D graphics representation), including known or already studied objects and/or structures and the user's current physical location simultaneously effectively guiding the user within the multi-dimensional space and effectively indicating to the user where to make markings when the user is performing a layout of the multidimensional space. Further, the system of the present invention can display the virtual space as an overlay to the multi-dimensional space depiction. Thus, as the user physically moves within the multi-dimensional space, the system of the present invention is able to track the user's location and display said location within the graphical representation of the actual and/or virtual space in real time.

As will be clearly shown throughout this specification, a task is done 'automatically' when some or all of the steps needed to complete the task are performed by the system equipment of the present invention in accordance with the method of the present invention. Some or all of the final steps for the various tasks discussed herein are performed by the system equipment which may be directed by firmware and/or software embedded in such equipment; such tasks are thus performed automatically.

Virtual space is visual representation or mathematical representation of a multi-dimensional space that can be depicted based on information (e.g., graphical and/or textual) describing the boundaries, particular objects and or structures of a design for the construction site, the positioning and orientation of the objects and/or structures with respect to each other and with respect to designated established points of references in the multi-dimensional space and the actual physical dimensions of the defined objects and/or structures. Information memorializing the design is referred to as virtual information. One example of virtual information is a set of drawings (e.g., 2D or 3D CAD (Computer Aided Design) drawings) generated by an architect or engineer for a construction project. Hereinafter, the terms "construction site" and "multi-dimensional space" will be used interchangeably.

The term "study" as used herein refers to the process of a user (preferably an Architectural Navigator) using the system of the present invention in accordance with the method of the present invention to locate reference points and other specified locations (e.g., monuments, benchmarks) in a construction site, measure distances between these specified points, identify existing structures and/or objects within the construction site, measure the actual physical dimensions of the existing objects and/or structures and measure distances between existing objects and/or structures located within the construction site to automatically generate a representation (e.g., graphical—2D or 3D CAD drawing or other type of representation) of the construction site in real time, i.e., as the study is being done. The reference points are specifically defined points or locations within the construction site that are designated as points from which measurements are initially done. Reference points are usually identified in the virtual information by the designers (e.g., architects, engineers) and are usually marked at the multi-dimensional space by an on-site surveyor of the multi-dimensional space. The information generated from the study may become part of the virtual information.

The term "layout" as used herein refers to the process of automatically identifying, in real time, the precise location of specific point and/or the location, orientation and arrangement of objects and structures within a construction site based on reference points and virtual information generated from a design and/or study. The layout process may also involve the guiding of the user of the system within the multi-dimensional space being laid out to a precise location. The precise location can then be marked by the user or the user of the present invention can use the equipment that is part of the system of the present invention to automatically mark the locations of the objects and structures within the construction site.

The system and method of the present invention enable a user to execute a study and/or a layout of a construction site by performing a mapping between the construction site (i.e., multi-dimensional space) and the virtual space. A mapping refers to specifying a known point in one space and calculating or determining a corresponding point in another space where there is a well defined relationship (e.g., mathematical) between the two spaces. For example, as is done during the layout, a mapping from the virtual space to the multi-dimensional space occurs when the method of the present invention applies the well defined relationship to a point within the designer's drawings to determine or calculate the location of the corresponding point in the multi-dimensional space.

The term 'construction site' as used in this specification is understood to encompass any multidimensional space with defined boundaries within which construction of objects and structures and their positioning and orientation with respect to each other can be performed; the construction site also includes any multi-dimensional space in which part or all of the construction has been done. Thus, the terms 'construction site' and multidimensional space' will hereinafter be used interchangeably.

The method of the present invention automates the processes associated with using points of references such as benchmarks, targets and/or provided references to perform an automatic study or an automatic layout or both of a multidimensional space. Typically, prior to the commencement of construction at a construction site, reference lines and benchmarks are provided by surveyors. These provided references are typically 2 lines perpendicular to each other forming a 2-dimensional plane representing an x-y coordinate system (perpendicular lines one of which is an x axis and the other is a y axis) established by surveyors as the lines from which measurements for positioning and/or orienting objects and structures by the tradesmen (e.g., carpenters, plumbers, electricians) at the construction site. Furthermore, surveyors may also provide "benchmarks" which are specific points in the construction site measured from the provided reference lines to further enable tradesman to orient objects and/or structures within the construction site. Benchmarks are typically points offset from anywhere along the reference lines and identified on existing structures (e.g., column) within the construction site. Thus, for example, if the reference lines for a 2-dimensional space are traced on the floor of the construction site, the benchmarks may be points measured from anywhere along either of the two reference lines where such point may lie within the x-y plane formed by the reference lines of may lie along a z-axis perpendicular to both the x and y in a third dimension three dimensional space. Thus, the benchmarks are points of references that exist within an N-dimensional space where N is an integer equal to 2 or greater.

I. The Method and System of the Present Invention

The method of the present invention allows a user to introduce targets, within the multidimensional space, which are additional points of references that are to be used during a study and/or layout of the multidimensional space. The targets differ from the benchmarks in that they are devices arbitrarily positioned throughout the multidimensional space that can receive and transmit (actively or passively) information to the system of the present invention to establish additional points of references. For example, a target may be a relatively small square shaped flat material having a reflective surface which can reflect infrared or other electromagnetic signal (light, radio signal, laser beam) to allow a point of reference within the multidimensional space to be established and documented by the system of the present invention. Such target can be affixed onto various surfaces within the multidimensional space by a user of the system of the present invention to allow for the automatic study and/or layout of the multidimensional space. Another example of a target is a prism located on a pole positioned within the construction space. Targets can be stationary or mobile. An active target may generate and transmit signals to other equipment of the system of the present invention to indicate its position within the multidimensional space. A passive target reflects energy it receives from other components or equipment of the system of the present invention to indicated its location within the multidimensional space.

Referring to FIG. 1, there is shown a flow chart of the method of the present invention which is realized using the system of the present invention. Various embodiments of the system of the present invention are shown in FIGS. 2-15. In the system embodiments shown the method of the present invention can be implemented as a software program residing in a Processor device (e.g., laptop computer). The processor device is any device on which software executes the steps of the method of the present invention as commands to various other components of the system to execute the automatic study and/or layout of the multidimensional space.

The System Software hereinafter referred to as Theocad (SM) can be implemented as a part of Computer Aided Design (CAD) software such as AutoCAD® software that allows a user to generate a graphical representation of a multidimensional space. The software also has a graphical user interface (GUI) built for ease of use within the construction and architectural marketplace. In this manner, Theocad (SM) is seamlessly integrated within AutoCAD® to take advantage of the graphic generating capabilities of such software. It should be noted that Theocad (SM) can be implemented as a standalone software package that can generate its own graphics. Theocad (SM) is geared to performing specific location, navigation, reading and writing construction tasks rapidly.

Theocad (SM) can be located within a handheld, laptop, tablet or desktop computer or other Processor with the ability to communicate with (send information to or receive information) a Master station module. The information can be commands and/or responses generated by the Master station module or the Processor. The Processor can be any microprocessor, microcontroller, microcomputer, mainframe computer, desktop computer or other processing device which can execute instructions in the form of a software program and which has a display for displaying graphics. The Master station module can be any well known device that can measure, distance, angle and otherwise location of reference lines, benchmarks and targets disposed within the multidimensional space. For example, the Master station module shown in FIG. 2 can be a device commonly referred to as a total station and one particular applicable total station can be a Leica Geosystems Series 1200 Model 3. The Leica 1200 total station is able to resolve a location at a 1000 feet distance with a precision of ±$\frac{3}{16}$ of an inch within a 3 second period. The Leica 1200 Series Model 3 total station is able to track a moving prism and thus track any mobile device to which measure distance to targets such as prisms and other reflective targets. The System Software thus can function as distance measurement, navigation and documentation control software. The System Software sends commands to and receives telemetry back from the Master Station. The System Software sends commands to the Master Station firmware telling it to perform specified tasks on demand (e.g., turn in a specified direction or move up or down to a particular angular position, turn the visible laser pointer on or off, measure distance or angle etc.). The Master Station responds by executing the requested functions and then sending performance or measurement telemetry back to the System Software. It should be noted that all of the Software (e.g., TheoCAD and AutoCAD) can be located in the Processor, in the Master Station or portions of the software can reside in both the Processor and the Master station.

Referring temporarily to FIG. 2, there is shown a first embodiment of the system of the present invention comprising Master station module 100 (shown as a stationary robotic device) having a tripod (107), laser range finder 104, a wireless communications device 102 (including an antenna)

located on top, and a computer and user interface 106. The system further comprises Processor 114 and at least one target such as prism 108. Master station module, implemented as a total station is a robotic device that moves laser 104 to constantly track prism 108 located on pole 112 which is similar to a surveyor's pole, except that it too has a wireless communications device 110 located at one of its ends as shown. The total station knows the location of the prism, and that location is communicated to Processor 114 through communication device 110 by Master station module 100. Communication device 100 is coupled to Processor 114 and is used by Processor 114 to receive and/or transmit information to Master station module 100 which has its own communication device 102. Communication devices 110 and 102 can be any type of wireless communication devices that are able to exchange information with each other in accordance with a protocol. A protocol is a set of rules that dictate how information is formatted, transmitted, received and interpreted by devices which transmit and/or receive information. The protocol may be a well known protocol or one designed by the manufacturer of the system of the present invention. Should communication of the location of the prism be interrupted, Master station module 100 would institute a search pattern program in order to find the prism. Because Processor 114 is attached to pole 112, the location of Processor 114 within the construction site can be determined by Master station module 100. More specifically, Master station module 100 is able to determine its location within the construction site using the well known procedure of triangulation. Therefore, because Master station module 100 knows its location and the relative location of Processor 114, the location of Processor within the construction site can also be determined by Master station module 100. Thus Processor 114 is shown as a portable processing device executing AutoCAD® and TheoCAD (SM) software device is loaded with special software that displays modified CAD drawings of a site (both plan and elevational views), to form a virtual map of a construction site. So, the handheld device can now overlay its position on the virtual map.

Referring back to FIG. 1, the method of the present invention shows step 10 where the communication devices establish communication with each other. Master station module 100, targets, and Processor 114 of FIG. 2 may have communication devices associated with them. Upon the initial activation of the system of the present invention (i.e., system is first turned ON), the various communication links between the different communication devices are established. The establishment of the communication link between any two devices entails confirming that the devices are ON and that the devices can communicate with each other. Further, the communication between the devices is such that they can correctly interpret each other's information. Typically a handshaking procedure between two devices is used to establish a link between the two devices. The link is thus the ability to effectively communicate in accordance with a protocol being followed by the system.

In step 12 of the method of the present invention, the various points of references are identified and located. Surveyors typically provide reference lines and benchmarks. Additionally targets strategically positioned through the construction site are also located and identified. Furthermore, the Master station is positioned within the construction site with respect to the reference lines or the benchmarks or the targets. There may be occasions where there are no reference lines available at the construction site. In such occasions the targets are used as reference points with respect to which the Master station is positioned. The benchmarks and reference lines may be indicated in a CAD drawing of the multidimensional space where said drawing is stored in the Processor (e.g., Processor 114 of FIG. 2) of the system or can be downloaded into the Processor of the system. Targets are installed or affixed to various points within the construction site by the user and thus presumably their locations are known by the user. When a Leica model 1200 total station is used as a Master station, it can automatically locate certain types of targets such as a prism.

In step 14 of the method of the present invention, the various points of reference are measured using the Leica Model 1200 total station (e.g., Master station 100 of FIG. 2). In particular the distances from the points of reference to the Master station and the angles (vertical and horizontal) of the reference points with respect to the Master station are measured and stored in the total station. The total station transmits this information to the Processor (e.g., Processor 114 of FIG. 2). The Processor (such as Processor 114 of FIG. 2) which is under the control of TheoCAD (SM) using AutoCAD® as a platform is able to process said information to generate at least two specific types of information leading to steps 16 and 18 of the method of the present invention. It should be noted that TheoCAD (SM) may be used as standalone software and use its own set of instructions to generate the information discussed in steps 16 and 18 of the method of the present invention.

In step 16 of the method of the present invention, the TheoCAD (SM) software calculates, though the well known process of triangulation, the location of the Master station within the multidimensional space being studied. At least two reference points are used to determine the location of the Master station. The TheoCAD and AutoCAD software residing in the Processor uses at least two reference point locations to determine the actual location of the Master station and display said location in a display of the Processor. In construction sites where satellite signals are accessible, the method of the present invention can use the well known GPS (Global Positioning System) to determine the location of the Master station and thus the location of the Processor.

In step 18, the TheoCAD and AutoCAD software are able to generate 3-dimensional graphical representation of the construction site as the reference points are located, identified, measured, stored and processed as described above. Additionally, other reference points of the space that are not targets but are non-reflective surfaces can be used to help generate the 3-dimensional graphics. A stored CAD drawing of the construction site separately generated by an engineer or architect (not using the system of the present invention) can be downloaded onto the Processor and then aligned, through a mapping operation, with the 3-dimensional graphical representation of the construction site generated by the system of the present invention. The mapping operation is specifying a known point in one space and calculating or determining a corresponding point in another space where there is a well defined relationship (e.g., mathematical) between the two spaces. With the two spaces aligned, a user can readily see the discrepancies between the studied space and a space separately generated by an architect of the construction site. As each point is generated the connections between points are also generated allowing the system of the present invention to generate a 3-dimensional graphical representation of the construction site in real time. Further, the location of the Processor which may be held by a user and tracked by the Master station can also be displayed simultaneously with the space being generated and the overlaid space separately generated using AutoCAD, for example, by an architect. In this manner, the user of the system of the present invention can operate said system using the method of the present invention to navigate a virtual space and also to make markings in the actual space that represent the location of objects and/or structures of the virtual space. That is, the user of the system can be guided by said system in real time to perform a layout of the construction site.

II. Other Embodiments of the System of the Present Invention

FIG. 3 shows a second embodiment of the system of the present invention wherein the Master station module 100 (e.g., Leica total station 1200 series model 3) points its laser beam 109 at a target 118, the location of which is determined by a user 116 inputting coordinates into the Processor 114, and the coordinates are communicated wirelessly to the total station. The user tells the Processor 114 the position where it wants the laser to illuminate, and the Master station module's laser beam is directed to that position.

FIG. 4 shows a third embodiment wherein the Master station module 100 locates prism 108 physically located on mobile robot 122 having a substation 120 mounted thereon. The Master station module 100 station comprises software which can direct the mobile robot to a specific location via wireless communications. The mobile is "blind," but it is navigated by the Master station module 100 circuitry under the control of the software residing in the computer 106 of the master station module 100. The substation 120 mounted onto the mobile unit 122 can perform similar operations to that of Master station module 100, but is under the control of module 100. The mobile robot also comprises a wireless communications device 110 and a laser 118. The mobile robot's laser can then illuminate any point location requested by the Master station module 100. This is useful since Master station module 100 is stationary, and some locations are not available to the Master station module by line-of-sight.

FIG. 5 shows a fourth embodiment which is similar to the third embodiment of FIG. 4, but wherein the mobile robot 122 projects a graphic overlay on a surface by rapidly moving its laser beam 111 according to a desired pattern 124. This is useful where it is desired to indicate to construction workers where to place structural materials. For example, if it were to be desired that 12-inch pipe be laid vertically, the mobile robot laser would project a 12-inch diameter circle on the floor or horizontal surface.

FIG. 6 also shows the fourth embodiment described above, where the pattern displayed is a two-dimensional projection of a three-dimensional overlay 126.

FIG. 7 shows a fifth embodiment wherein the mobile robot 122 is directed to specific position coordinates, and is directed to mark the floor with paint or dye using a paint sprayer mechanism 128. For example, the entire plan view of a CAD drawing can be painted on the floor in this manner.

FIG. 8 shows a sixth embodiment wherein the mobile robot 122 is directed to specific position coordinates, and is directed to perform certain tooling operations such as drilling a hole in the floor using drill head or marking tool 130.

FIG. 9 shows a seventh embodiment wherein the mobile robot 122 is directed to specific position coordinates to perform metrological measurements. The mobile robot has a mechanical arm 132 to which a computerized measurement, pointing, or marking device 133 is attached. The figure shows such metrology being performed.

Figure 10:
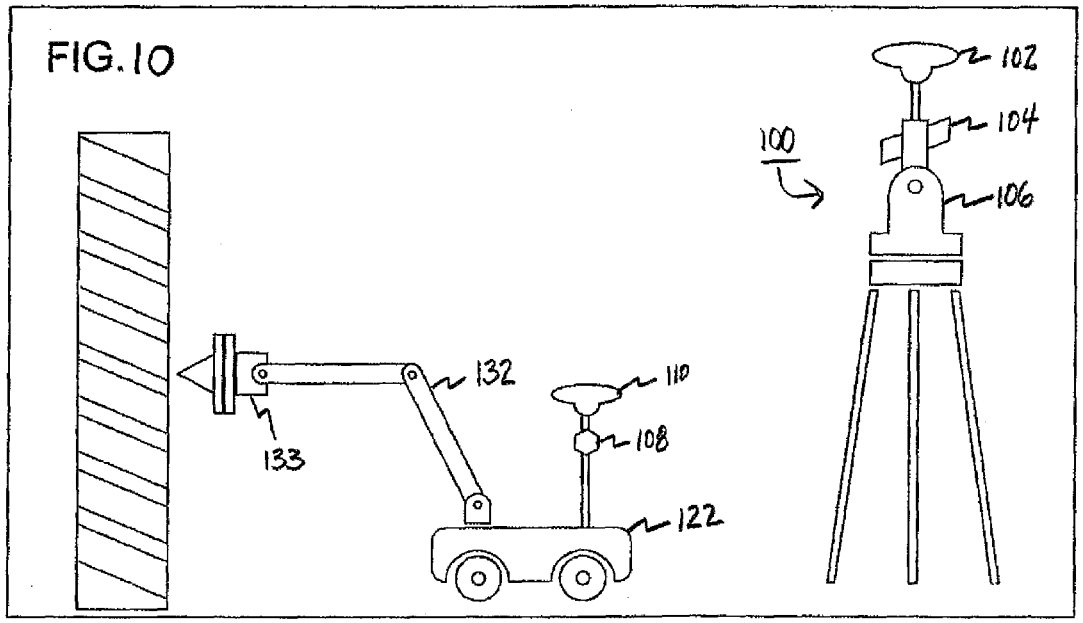
FIG. 10 shows the seventh embodiment where the marking takes place on a wall.

FIG. 10 shows the seventh embodiment as described above, except that the metrology is being performed on a wall.

Figure 11:
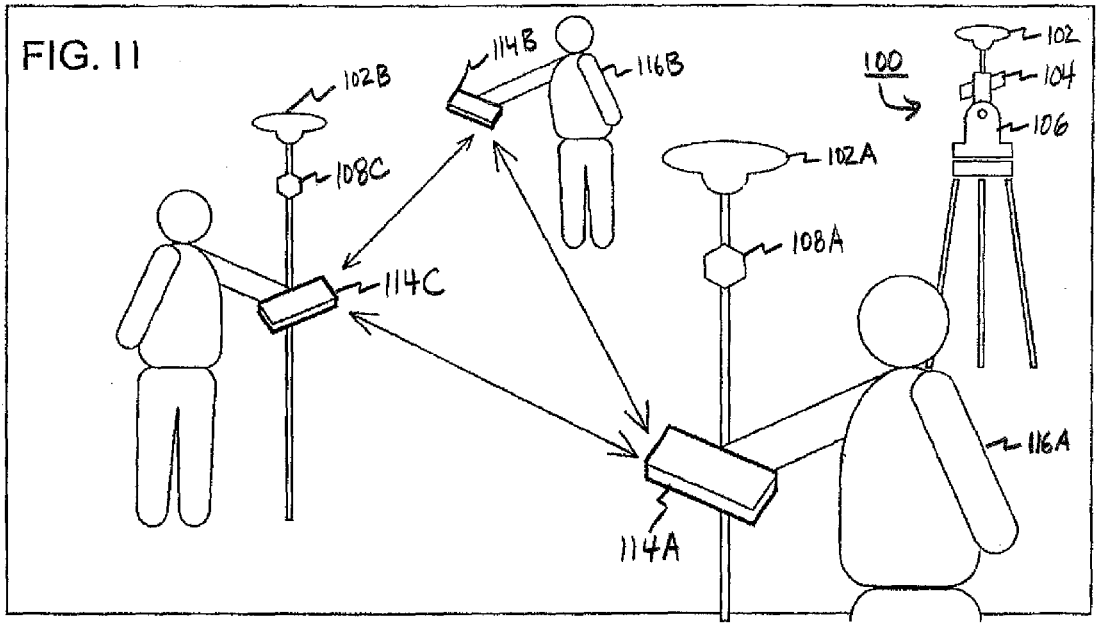
FIG. 11 shows an eighth embodiment similar to the first embodiment except that the Master station tracks multiple prisms, each communicating with a different Processor and the Processors communicate with each other.

FIG. 11 shows an eighth embodiment of the wherein the Master station module 100 station communicates with a plurality of poles (each as shown in the first embodiment of FIG. 2). The Processors (114A, 114B and 114C) operated by user 116A, 116B and 116C respectively communicate with one another in a local area network (LAN). User 116B does not have a pole but is able to communicate with the Processors (114A and 114C) to locate the position of prisms 108C and 108A. The LAN can either have a client-server protocol or a peer-to-peer protocol. In any event, position coordinates of any handheld unit is known to every other handheld unit.

FIGS. 12-14 show a ninth embodiment. In this embodiment, a total station is not employed. Instead, two stationary laser rangefinder units 221A and 221B capable of communicating to a Processor 214 operated by a user 216 (see FIGS. 12, 13 and 14) measure their vertical distance from the ground using laser beam 223A and 223B and the distance separating them. Details of a rangefinder unit are shown in FIG. 12A; each rangefinder has a light sensor 21, a rotating prism 22 and a laser 23 and communication equipment (not shown). The rangefinder units encode their own locations, and they send telemetric data to a target sensor. The target sensor can read the distances to each of the rangefinder units (221A and 221B) for triangulation as well as the angles (A and B) of the triangle formed. This is shown in FIG. 13. FIG. 14 shows an alternate method of accurately measuring the height of a rangefinder unit using a pole itself having a laser 215 mounted on a movable unit 230 with sensors 217 along its height and mirrors 211, 213 affixed at each end of the movable unit 230. Once the sensor picks up the laser beam 219 of rangefinder 221A, the true height above a reference can be measured using the known position of the sensor array on the pole. The movable unit may also have communication devices to transmit information to Processor 214.

FIG. 15 shows a portable processor handheld unit that measures its position using three gyroscopes and an accelerometer. Communication of the handheld unit with other devices is performed using radio frequency signals. The inertial guidance system is a multiplatform wireless handheld computer, PDA, laptop, tablet, etc. combined with inertial measurement hardware and or electronics and/or software that comprises one or more gyroscopes, a resonating ring to compensate for gyro drift and at least one highly accurate variable capacitance accelerometer. To initialize the unit the operator must first reference a control point in space.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system for automatically generating a graphical representation of a multidimensional space comprising:
 a) One or more robotic master stations situated at known reference positions in the multidimensional space,
  wherein each master station determines its own position in the multidimensional space by triangulation;
  wherein each master station may constantly move a tracking laser beam both horizontally and vertically;
  wherein each master station further comprises a receiver to track a moving prism in the multi-dimensional space by receiving a reflection of the tracking laser beam;
  wherein each master station further comprises a receiver to receive telemetry having commands that instruct that master station to perform specified tasks; and wherein each master station is capable of performing the specified tasks;

b) one or more targets positioned in a multidimensional space to serve as additional points of reference within the multidimensional space, wherein each target further comprises a prism that reflects the laser light generated by the one or more master stations back to the particular master station that generated the incident laser light; and c) a processor in communication with the master station, said processor receiving telemetry from the one or more master stations and processing line of sight measurements obtained from tracking the reflected laser light to determine the additional reference points and to generate a graphical representation of the multidimensional space and presenting the graphical representation on a display to a user on at least one system component, wherein:

the graphical representation is based upon processed parameters associated with the reference points; and the graphical representation is updated as the user moves about the multidimensional space so as to facilitate the user navigating within the multidimensional space.

2. The system of claim 1, wherein the multidimensional space is a construction site.

3. The system of claim 1, wherein the processed measurements include distance and angle of the one or more targets in relation to the master station.

4. The system of claim 1, wherein at least one of the targets is stationary.

5. The system of claim 1, wherein at least one of the targets is mobile.

6. The system of claim 1, wherein the processor automatically overlays an architectural drawing onto the graphical representation to guide a user within the multidimensional space being displayed.

7. The system of claim 1, wherein the processor is any one of a handheld device, laptop, tablet, desktop computer.

8. The system of claim 1, wherein the graphical representation is generated in real-time.

9. The system of claim 1, wherein the graphical representation is three-dimensional.

10. The system of claim 1, wherein the graphical representation is two-dimensional.

11. The system of claim 1, wherein the display is on the processor.

12. The system of claim 1, wherein the display is on the master station.

13. A method of automatically generating a graphical representation of a multidimensional space, the method comprising:

a) positioning at least one master station within a multidimensional space wherein each master station determines its own position in the multidimensional space by triangulation;

wherein each master station may constantly move a tracking laser beam both horizontally and vertically;

wherein each master station further comprises a receiver to track a moving prism in the multi-dimensional space by receiving a reflection of the tracking laser beam;

wherein each master station further comprises a receiver to receive telemetry having commands that instruct that master station to perform specified tasks; and wherein each master station is capable of performing the specified tasks;

b) providing one or more reflective targets as points of reference within the multidimensional space, wherein each target further comprises a prism that reflects the laser light generated by the at least one master station back to the specific master station that generated the incident laser light;

c) measuring parameters associated with the points of reference using the at least one master station and a processor;

d) processing the measured parameters to determine a location of at least one master station and the one or more reflective targets within the multidimensional space;

e) generating a graphical representation of the multidimensional space based on the processed parameters associated with the points of reference;

f) presenting the graphical representation on a display on at least one system component to a user; and g) allowing the user to physically navigate within the multidimensional space by updating the graphical representation presented on the display as the user moves about the multidimensional space.

14. The method set forth in claim 13, wherein presenting includes automatically overlaying an architectural drawing onto the displayed graphical representation to identify discrepancies between the architectural drawing and the graphical representation.

15. The method set forth in claim 13, further comprising tracking location of the user as the user moves about the multidimensional space.

16. The method set forth in claim 13, wherein generating the graphical representation is done in real-time.

17. The method set forth in claim 13, further comprising allowing a user to be navigated within the multidimensional space using a handheld system component.

18. The system of claim 1 wherein the processor updating the graphical representation on the display as the user physically moves about within the multidimensional space, thereby allowing the user to know in real time where he or she is positioned relative to the known reference positions and the additional points of reference.

* * * * *